Dec. 1, 1942.                S. A. MOORE                2,303,947
                           SOLDERING IRON
                        Filed Aug. 26, 1940
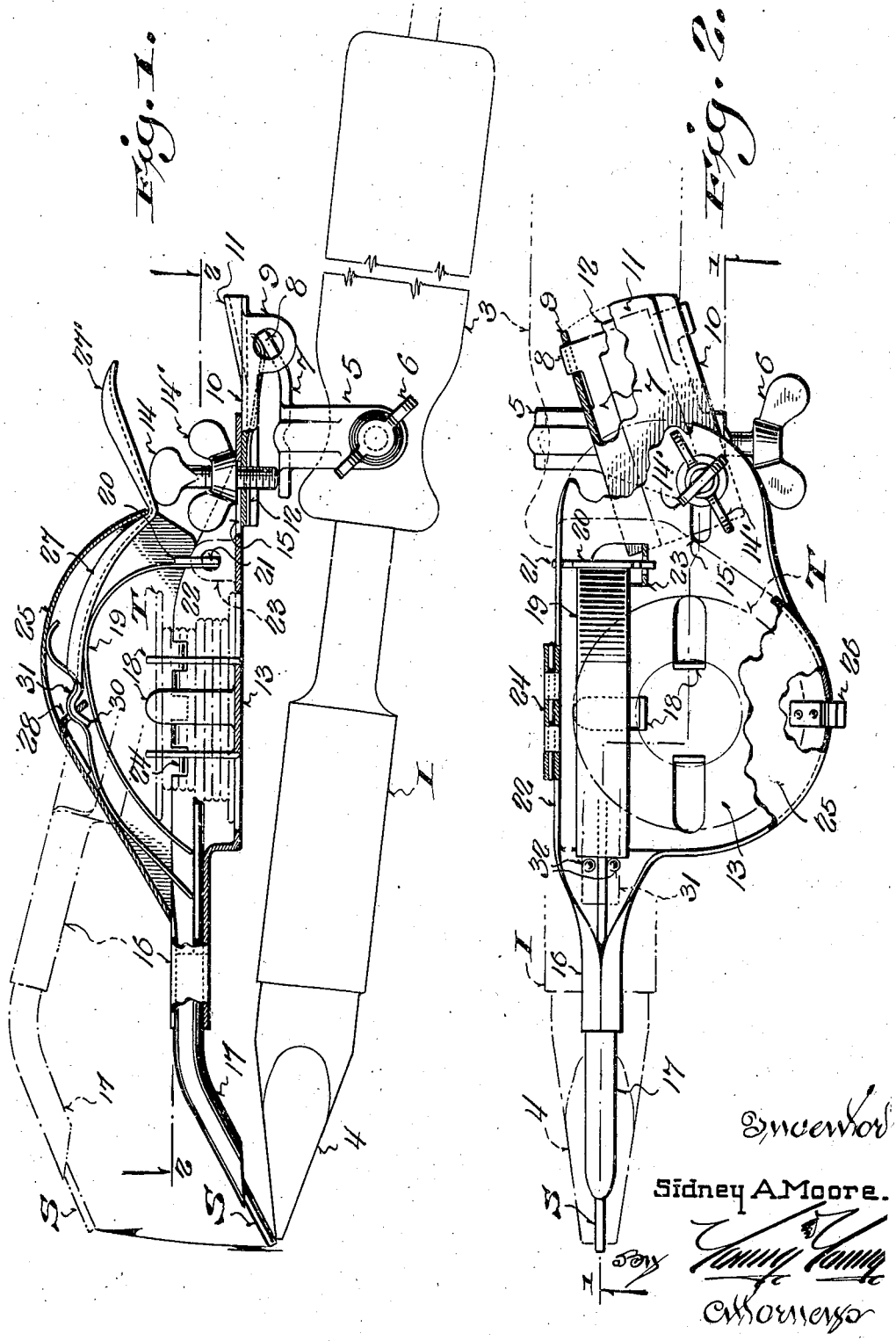
Inventor
Sidney A. Moore.
By
Attorneys Patented Dec. 1, 1942

2,303,947

UNITED STATES PATENT OFFICE 2,303,947

SOLDERING IRON

Sidney A. Moore, Milwaukee, Wis.

Application August 26, 1940, Serial No. 354,247

5 Claims. (Cl. 113—109)

This invention pertains to soldering irons, and more particularly to means for feeding solder to the tip of an iron.

Applicant is aware that it is old in the art to feed a soldering wire from a spool to the tip of both electric and flame-heated irons. However, as far as is known, the earlier devices have proved to be impractical with respect to the feeding mechanism, or inability to clean the tip of the iron while in use, or both.

The invention has primarily for its object to overcome the foregoing objections by the provision of a comparatively simple and positive solder feeding mechanism, which can be readily shifted out of operative position to permit complete access to the tip of the iron for wiping or cleaning the same, without material interruption of the soldering operation.

Incidental to the foregoing, a more specific object of the invention resides in the provision of a solder feeding mechanism, which can be quickly attached to conventional soldering irons without altering their construction.

A further object resides in the provision of a pivotal connection between the solder guide and iron, to allow the guide to be shifted away from the tip of the iron for wiping.

Lastly, it is an object of the invention to provide for complete adjustability of the solder guide with relation to the iron tip, which not only compensates for various shapes and lengths of irons, but enables the solder to be fed to any edge of the tip placed in contact with the work.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:

Figure 1 is a longitudinal section through a solder feeding mechanism incorporating the present invention and attached to a conventional iron, the section being taken on the line 1—1 of Figure 2; and Figure 2 is a plan section, taken on the line 2—2 of Figure 1.

Referring now more particularly to the accompanying drawing, it is to be understood that while the invention has been illustrated as an attachment for conventional soldering irons, the principles may be incorporated in a specially constructed iron without departing from the invention.

In the drawing, 1 designates generally a conventional soldering iron, including a handle 3 and the usual tip 4. Detachably mounted upon the forward end of the handle is a bracket or yoke 5, clamped thereon by a thumb-screw 6. The connecting top portion of the yoke is provided with a rearwardly extending flange 7, provided adjacent its rear edge with lateral pintles 8 for pivotal reception of depending ears 9, formed upon the downturned edges of a supporting plate 10, the rear portion of which is provided with a domed thumb-grip 11 to facilitate pivotal movement of the plate upon the yoke, as will be hereinafter described. A flat spring 12, secured to the underface of the plate 10 and engaging the flange 7 of the yoke, serves to normally urge the plate 10 into operative position, and releasably hold the same in raised position, as will be hereinafter described in connection with the operation of the invention.

Mounted upon the plate 10 is a spool support 13, which is secured upon the plate for swinging and longitudinal movement by a thumb-screw 14, threaded in the plate 10 and passing through a slot 15 formed in the support. As best shown in Figure 1, it will also be noted that the thumb-screw 14 engages the yoke 7 to determine the operative position of the spool support 13, which is clamped upon the plate 10 by a thumb-nut 14', that also serves as a locknut to hold the thumb-screw 14 in adjusted position.

The forward end of the spool support 13 is provided with a tubular extension 16, formed by rolling the edges of the extension together, as best shown in Figure 2. Set into the end of the tubular extension, either permanently or adjustably, is a tubular guide finger 17, the outer end of which is inclined downwardly and terminates in close proximity to the soldering iron when in operative position. The solder wire S trained through the guide 17, is carried by a conventional spool T, indicated in dotted lines in the drawing, and rotatably held upon the support by a plurality of upturned fingers 18, formed out of the bottom of the support.

To provide for positive feed of the solder wire S, a dog 19 in the form of a flat spring is connected to a plate 20, provided with laterally projecting pintles 21 journaled in the upturned side 22 of the support 13, and an ear 23 bent upwardly from the bottom of the support.

Connected to the side 22 of the support by a hinge 24 is a domed cover 25, which forms an enclosure for substantially the entire top of the support and the open portion of the extension 16. The cover is held in closed position by a spring latch 26, carried by the support opposite the hinge 24.

For manipulating the spring dog 19, a thumb-trigger 27 is pivotally connected at its inner end in a slotted bracket 28, carried by the cover 25, the inner end of the trigger 27 having an arcuate lip 30 upon which a flat spring 31 is seated. As best shown in Figure 1, the forward end of the spring 31 is bowed to engage the cover 25, and extends downwardly to engage the solder wire S forwardly of the operative edge of the spring dog 19, thus serving as a locking pawl to hold the solder wire against retrograde movement upon return of the resilient dog to its normal position.

The rear end of the spring 31 also engages the cover 25 to create tension and frictional bind upon the trigger 27, for holding the same in its normal position when the cover 25 is swung upwardly for removal or replacement of the spool T. The rear end of the trigger 27 is provided with a thumb-piece 27' projecting beyond the cover, and in convenient location for manipulation by the operator without removing the hand from the handle 3 of the soldering iron.

Considering the operation of the structure described, the parts are shown in their normal operative position, in which the solder wire is directed to the end of the tip 4 of the soldering iron, and, as heretofore explained, the spool support 13 has been adjusted on the plate 10 by the thumb-screw 14 and thumb-nut 14', to bring the end of the guide 17 into desired position with relation to the tip of the iron. As the soldering operation is performed, the operator intermittently actuates the trigger 27 by depressing the thumb-piece 27'; and through engagement of the trigger 27 with the resilient dog 19, the forward end of the dog engaging the solder wire S is caused to bite into the wire and feed the same forwardly to supply solder to the iron as the same is consumed.

Upon release of the trigger, the resiliency of the dog 19 returns the same to its normal raised position, as shown in the drawing, and, as stated, the spring 31, acting as a holding dog, prevents retrograde movement of the solder wire.

During the feeding operation as described, the solder wire is held against lateral shifting by spaced nibs 32, formed in the extension 16 upon opposite sides of the solder wire, as best shown in Figure. 1.

Should it be desired to wipe or clean the end of the iron, as is frequently required in soldering, the operator grips the thumb-grip 11 and forces the same downwardly to swing the forward end of the plate 10 upwardly, thus shifting the support 13 and the guide 17 away from the tip, as indicated in dot and dash lines in Figure 1; it being understood that in actual practice the support is swung to a substantially vertical position, thus providing free access to the tip of the iron for wiping or cleaning, after which the support is returned to its normal position for continuing the soldering operation without undue interruption in the work.

From the foregoing explanation, considered in connection with the accompanying drawing, it will be apparent that a comparatively simple and positive feeding mechanism has been provided for soldering irons, the principles of the invention being applicable to specially constructed irons, or an attachment for conventional irons without alteration in their construction.

When used as an attachment, the universal adjustability of the supporting guide enables the solder wire to be fed to any desired portion of the tip placed in contact with the work, such adjustment being further facilitated by rotation of the handle 3; or, in instances where the handle is stationary on the iron, the yoke 5 is readily adjusted on the handle by means of the thumb-screw 6.

In addition to the foregoing, removal or replacement of the solder spool T is easily accomplished by releasing the latch 26 and swinging the cover 25 upwardly, giving access to the spool, and in this connection it will also be noted that the spring dog 19, which extends over the spool T, can be swung out of the way because of its pivotal connection on the support.

Having illustrated and described one specific form of the invention in considerable detail, what I claim is:

1. A solder wire feeding device for a soldering iron comprising, a support carried by the soldering iron, a plate extending longitudinally of the iron, means rockably mounting the rear end of the plate on the support, a guide carried by the forward end of the plate for directing the solder wire to the tip of the iron, a spool holder arranged directly on the plate intermediate the ends thereof, a spool of solder wire carried by the holder, manually actuated means for feeding the solder wire from the spool through the guide, and manually actuated means for rocking the plate on the support for lifting the guide away from the tip of the iron including a thumbpiece on the rear end of the plate disposed above the handle of the solder iron.

2. A solder wire feeding device for a soldering iron comprising, a support carried by the soldering iron, a plate extending longitudinally of the iron, means rockably mounting the rear end of the plate on the support, a guide carried by the forward end of the plate for directing the solder wire to the tip of the iron, a spool holder arranged directly on the plate intermediate the ends thereof, a spool of solder wire carried by said holder, manually actuated means for feeding the solder wire from the spool through the guide, manually actuated means for rocking the plate on the support for lifting the guide away from the tip of the iron including a thumbpiece on the rear end of the plate disposed above the handle of the soldering iron, and means for limiting the downward swinging movement of the plate on the support for regulating the position of the guide and solder wire relative to the tip of the wire.

3. A solder wire feeding device for a soldering iron comprising, a bracket detachably and adjustably secured to the handle of said iron, a plate rockably mounted adjacent its rear end on the bracket, a spool support slidably mounted on the forward end of the plate, a guide carried by the forward end of the spool support for directing the solder wire to the tip of the iron, a spool for the solder wire arranged directly on the support intermediate the ends thereof, manually actuated means for feeding the solder wire from the spool through the guide, and manually actuated means for rocking the plate on the bracket for lifting the guide away from the tip of the iron.

4. In a solder wire feeding device for a soldering iron, a bracket carried by the soldering iron, a plate rockably mounted on the bracket, a support for a spool of soldering wire having one end slidably mounted on the plate and provided with a longitudinally extending slot, a set screw extending through the slot and through the plate and engaging the bracket for limiting the downward swinging movement of the plate on the support, and an adjustable lock nut on the set screw for locking the plate and the support together in a selected adjusted position.

5. In a solder wire feeding device for a soldering iron, a bracket secured to the handle of said iron, a plate mounted on the bracket, a guide carried by the forward end of the plate for directing solder wire to the tip of the iron, a spool for the solder wire arranged on the plate intermediate the ends thereof, a resilient dog pivotally carried by said plate for engaging and feeding the solder wire through the guide, a cover hinged to said plate extending over the spool and dog, a trigger rockably carried by said cover and normally engaging the dog, and a pawl carried by said cover engaging the solder wire to prevent its retrograde movement.

SIDNEY A. MOORE.